US 8,238,372 B2

(12) United States Patent
Kuo

(10) Patent No.: US 8,238,372 B2
(45) Date of Patent: Aug. 7, 2012

(54) NETWORK ADDRESS TRANSLATION DEVICE AND PACKET PROCESSING METHOD THEREOF

(75) Inventor: Wan-Hsiu Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 567 days.

(21) Appl. No.: 12/483,267

(22) Filed: Jun. 12, 2009

(65) Prior Publication Data

US 2009/0323676 A1 Dec. 31, 2009

(30) Foreign Application Priority Data

Jun. 26, 2008 (CN) .......................... 2008 1 0302368

(51) Int. Cl.
*H04J 3/24* (2006.01)
(52) U.S. Cl. ...................................................... 370/474
(58) Field of Classification Search ........................ None
See application file for complete search history.

(56) References Cited

U.S. PATENT DOCUMENTS

| 7,050,447 | B2 | 5/2006 | Silverman et al. | |
|---|---|---|---|---|
| 7,298,745 | B2 | 11/2007 | Egevang | |
| 2003/0081605 | A1* | 5/2003 | Egevang | 370/392 |
| 2006/0250988 | A1* | 11/2006 | Garcia et al. | 370/260 |
| 2007/0206579 | A1* | 9/2007 | Voith et al. | 370/356 |
| 2008/0043741 | A1 | 2/2008 | Kuo | |

FOREIGN PATENT DOCUMENTS

CN 1295912 C 1/2007

* cited by examiner

*Primary Examiner* — Yong Zhou
(74) *Attorney, Agent, or Firm* — Altis Law Group, Inc.

(57) ABSTRACT

A network address translation device for processing session initiation protocol (SIP) packet is provided. The network address translation device receives a first SIP packet and a second SIP packet. The first SIP packet at least includes a former part of a message and the second SIP packet includes a latter part of the message. The network address translation device further obtains the former part of the message from the first SIP packet, reassembles the second SIP packet by combining the latter part with the obtained former part of the message from the first SIP packet, and translates and sends out the first SIP packet and the reassembled second SIP packet.

12 Claims, 3 Drawing Sheets

NETWORK ADDRESS TRANSLATION DEVICE AND PACKET PROCESSING METHOD THEREOF

BACKGROUND

1. Technical Field

Embodiments of the present disclosure relate to network address translation, and more particularly to a network address translation device and packet processing method.

2. Description of Related Art

Session initiation protocol (SIP) acts as a foundation protocol of voice over Internet protocol (VoIP) technology. Many IP telephones or soft phones communicate with each other by SIP. Generally, in such communication, two IP telephones act as two SIP clients and communicate with each other and the two SIP clients send packets including source addresses and destination addresses to each other. A network address translator (NAT) is a necessary part for a local area network (LAN) to transmit the packets to a wide area network (WAN). The NAT needs to translate the addresses of the packets if the two SIP clients are disposed on different sides of the NAT.

However, sometimes the SIP clients will transmit a plurality of anomalistic packets. The NAT will not translate the anomalistic packets and will directly drop the anomalistic packets, which reduces voice definition or even disables communication between the SIP clients. Therefore, a heretofore unaddressed need exists for a NAT that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
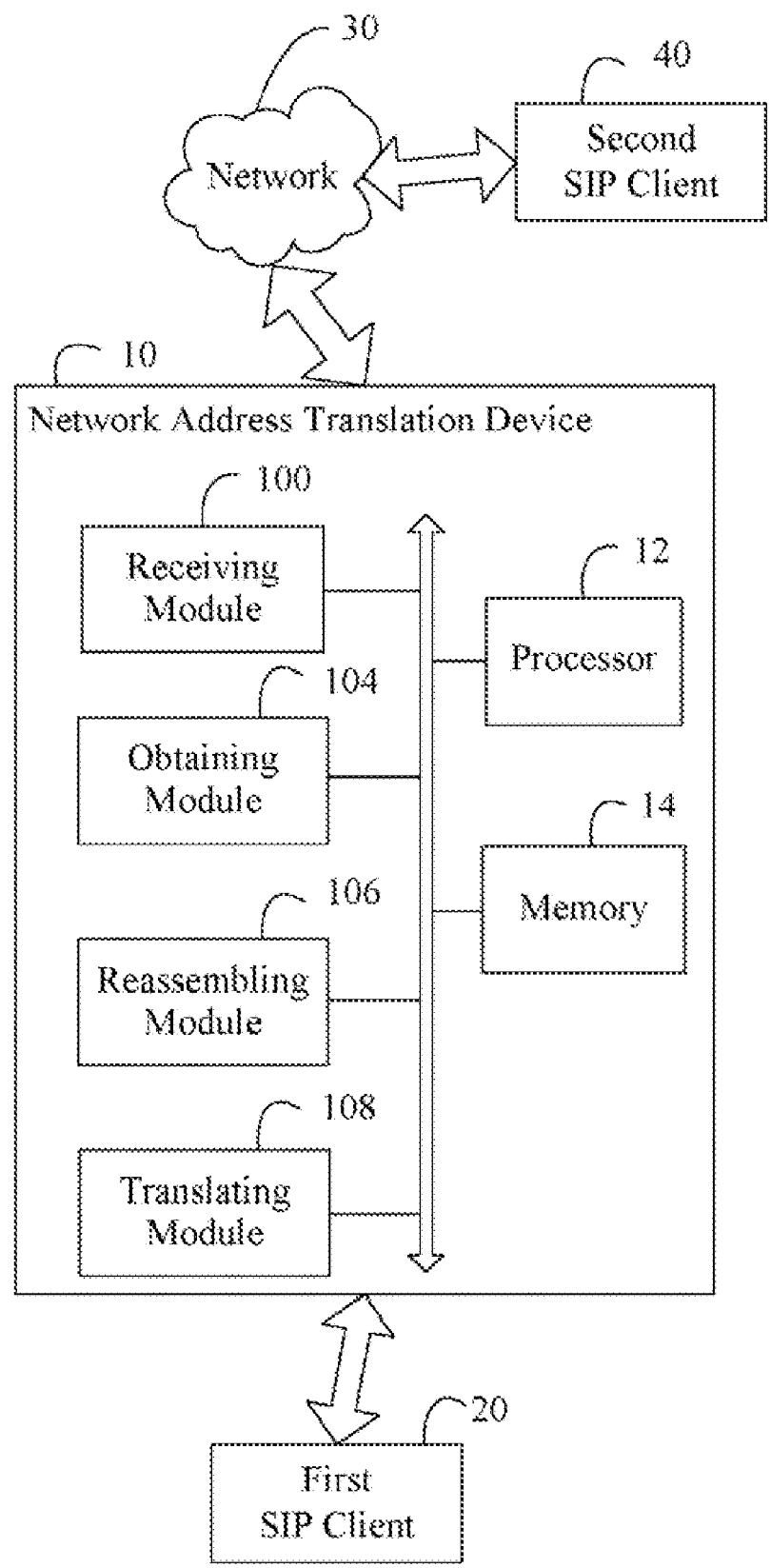
FIG. 1 is a schematic diagram of an application environment and functional modules of one embodiment of a network address translation device of the present disclosure.

FIG. 1 is a schematic diagram of an application environment and functional modules of a network address translation device 10 of the present disclosure. A first session initiation protocol (SIP) client 20 and a second SIP client 40 are disposed on different sides of the network address translation device 10 via a network 30 and communicate with each other via the network address translation device 10. The first SIP client 20 and the second SIP client 40 communicate with each other by SIP packets including source addresses and destination addresses. The network address translation device 10 is operable to translate the source addresses and destination addresses of the SIP packets and then send out the translated SIP packets.

Each normal SIP packet includes a header and a body. The header includes a content length field and the body includes communication data. In a normal SIP packet, the content length field is equal to a bit number of the communication data of the body. The network address translation device 10 translates and sends out the normal SIP packets so as to process the SIP packets. However, the SIP packet is an anomalistic SIP packet if the content length field is not equal to a bit number of the communication data of the body. The network address translation device 10 disclosed by the present disclosure is operable to process the anomalistic SIP packets.

For example, if the first SIP client 20 needs to communicate with the second SIP client 40, the first SIP client 20 sends invite messages to the second SIP client 40, and then the second SIP client 40 sends "200 OK" messages and "180 Ring" messages to the first SIP client 20. The invite message, the "200 OK" message, and the "180 Ring" message each include a header and a body. The invite message or the "200 OK" message may be transmitted via being divided into a first anomalistic SIP packet and a second anomalistic SIP packet. The first anomalistic SIP packet contains the header of the invite message or the "200 OK" message and the second anomalistic SIP packet contains the body of the invite message or the "200 OK" message. Two "180 Ring" messages may be transmitted by way of a first anomalistic SIP packet and a second anomalistic SIP packet. The first anomalistic SIP packet contains a first "180 Ring" message and a former part of a second "180 Ring" message. The second anomalistic SIP packet contains a letter part of the second "180 Ring" message.

In the embodiment, the network address translation device 10 includes a receiving module 100, an obtaining module 104, a reassembling module 106, a translating module 108, a processor 12, and a memory 14. The modules 100-108 may comprise one or more computerized instructions that are stored in the memory 14 and are executed by the at least one processor 12.

The receiving module 100 is operable to receive a first SIP packet and a second SIP packet. The first SIP packet at least includes a former part of a message. The second SIP packet includes a latter part of the message. In the embodiment, the message is the invite message or the "200 OK" message. The former part of the message is the header of the invite message or the "200 OK" message. The latter part of the message is the body of the invite message or the "200 OK" message.

In another embodiment, a first "180 Ring" message and a second "180 Ring" message are combined and then divided into the first SIP packet and the second SIP packet, and the message is the second "180 Ring" message. The first SIP packet includes the first "180 Ring" message and a former part of the second "180 Ring" message. The second SIP packet is a latter part of the second "180 Ring" message. The former part of the message is the former part of the second "180 Ring" message. The latter part of the message is the latter part of the second "180 Ring" message.

The first SIP packet includes a header and a body. The header includes a content length field and the body includes communication data. In the embodiment, the content length field of the first SIP packet is equal to the bit number of the body of the invite message or the "200 OK" message, and the bit number of the communication data of the first SIP packet is 0. In another embodiment, the content length field of the first SIP packet is equal to the bit number of the communication data of the first "180 Ring" message, and the bit number of the communication data of the first SIP packet is equal to the bit number of the communication data of the first "180 Ring" message and the former part of the second "180 Ring" message.

The obtaining module 104 is operable to obtain the former part of the message from the first SIP packet. In the embodiment, the obtaining module 104 determines whether a bit number of the communication data is greater or less than the content length field of the first SIP packet. The obtaining module 104 copies and buffers the former part of the message from the first SIP packet upon the condition that the bit number of the communication data is less than the content length field of the first SIP packet. The obtaining module 104 cuts and buffers excess part of the communication data which is greater than the content length field so as to obtain the former part of the message from the first SIP packet upon the condition that the bit number of the communication data is greater than the content length field of the first SIP packet.

For example, if the first SIP packet is the header of the invite message or the "200 OK" message, then the obtaining module 104 determines that a bit number of the communication data of the first SIP packet is less than the content length field of the first SIP packet, and then the obtaining module 104 obtains the header of the invite message or the "200 OK" message. If the first SIP packet contains the first "180 Ring" message and the former part of the second "180 Ring" message, then the obtaining module 104 determines that the bit number of the communication data of the first SIP packet is greater than the content length field of the first SIP packet, and then the obtaining module 104 obtains the former part of the second "180 Ring" message.

The reassembling module 106 is operable to reassemble the second SIP packet by combining the latter part of the message with the obtained former part of the message from the first SIP packet upon the condition that the obtaining module 104 has obtained the former part of the message from the first SIP packet. For example, if the obtaining module 104 obtains the header of the invite message or the "200 OK" message, then the reassembling module 106 reassembles the header of the invite message or the "200 OK" message and the body of the invite message or the "200 OK" message so as to generate the invite message or the "200 OK" message. If the obtaining module 104 obtains the former part of the second "180 Ring" message, then the reassembling module 106 reassembles the former part of the second "180 Ring" message and the latter part of the second "180 Ring" message so as to generate the second "180 Ring" message.

The translating module 108 is operable to translate and send out the first SIP packet and the reassembled second SIP packet. If the first SIP packet contains the header of the invite message or the "200 OK" message, the translating module 108 has sent out the header of the invite message or the "200 OK" message. Therefore, if the reassembled second SIP packet contains the header of the invite message or the "200 OK" message and the body of the invite message or the "200 OK" message, the translating module 108 translates the reassembled second SIP packet and then obtains and sends out the body of the reassembled and translated second SIP packet.

Figure 2:
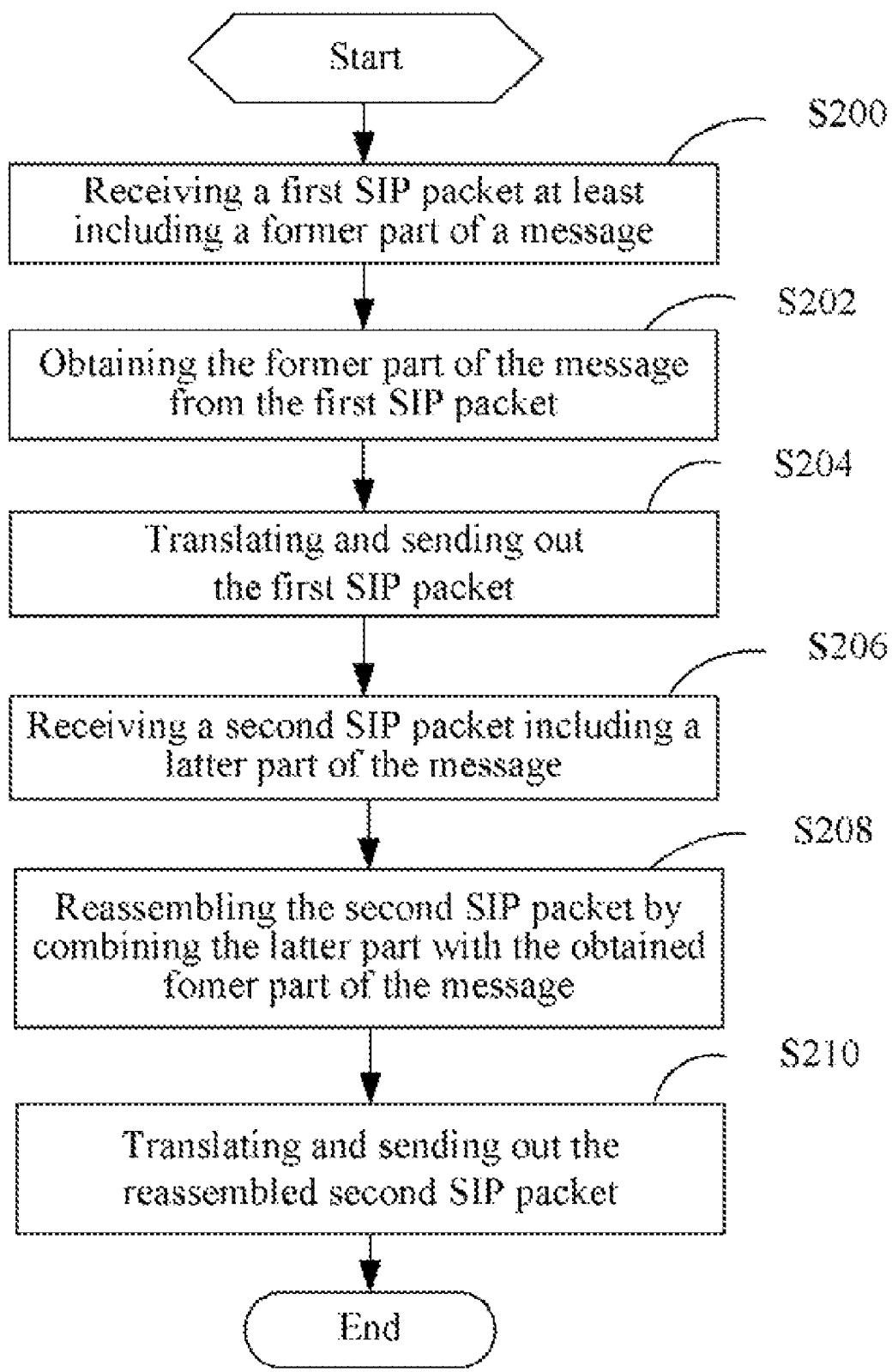
FIG. 2 is a flowchart of one embodiment of a packet processing method in accordance with the present disclosure.

FIG. 2 is a flowchart of a packet processing method in accordance with the present disclosure. The method may be embodied in the network address translation device 10, and is executed by the functional modules such as those of FIG. 1. Depending on the embodiment, additional steps may be added, others deleted, and the ordering of the steps may be changed while remaining well within the scope of the disclosure.

In step S200, the receiving module 100 receives a first SIP packet. The first SIP packet at least includes a former part of a message.

In step S202, the obtaining module 104 obtains the former part of the message from the first SIP packet.

In step S204, the translating module 108 translates and sends out the first SIP packet.

In step S206, the receiving module 100 receives a second SIP packet. The second SIP packet includes a latter part of the message.

In step S208, the reassembling module 106 reassembles the second SIP packet with the obtained former part of the message from the first SIP packet. Therefore, the reassembled second SIP packet includes the former part of the message and the latter part of the message.

In step S210, the translating module 108 translates and sends out the reassembled second SIP packet.

Figure 3:
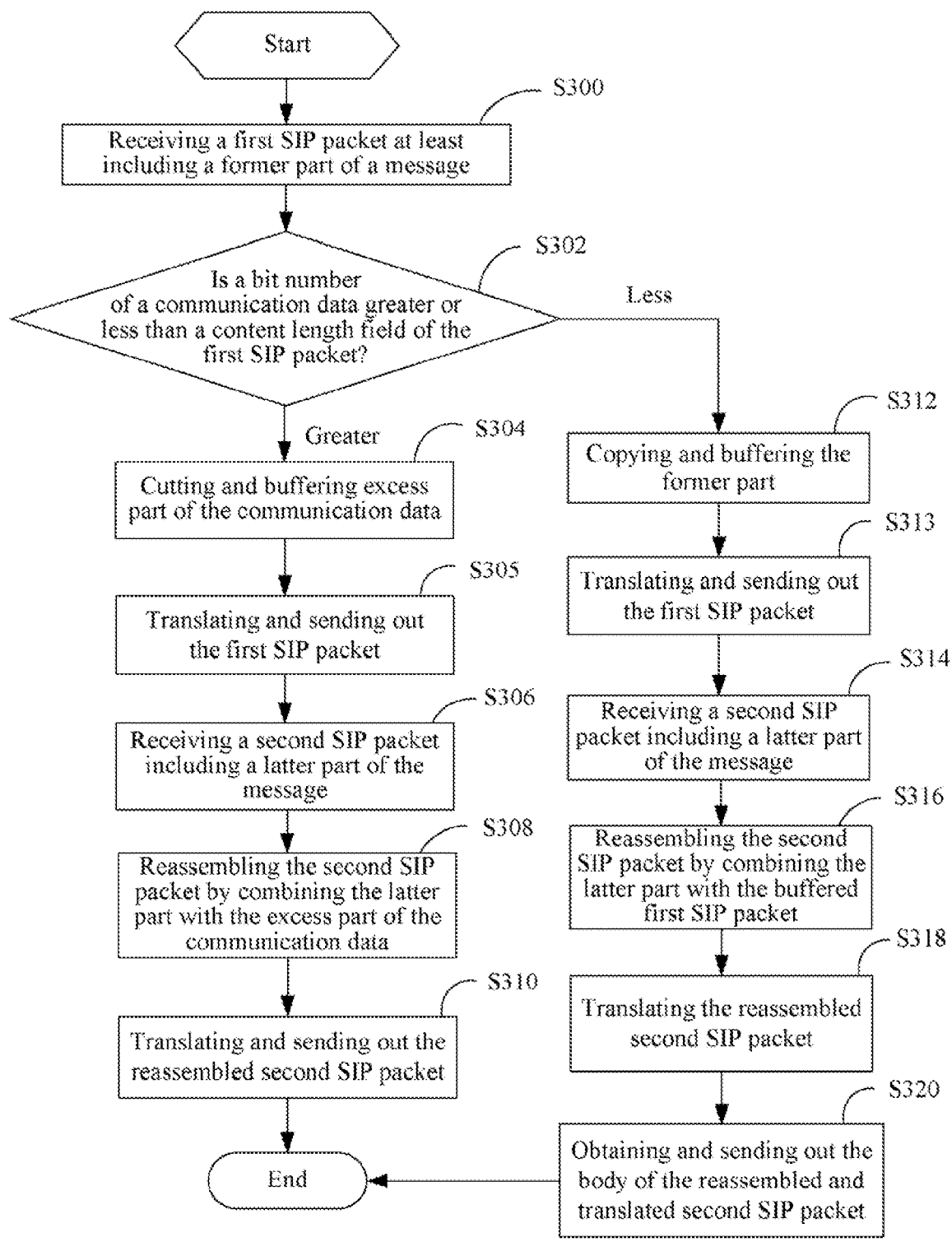
FIG. 3 is a detail flowchart of the packet processing method of FIG. 2 in accordance with the present disclosure.

FIG. 3 is a detail flowchart of one embodiment of the packet processing method of FIG. 2 in accordance with the present disclosure.

In step S300, the receiving module 100 receives a first SIP packet. The first SIP packet at least includes a former part of a message. The first SIP packet includes a header and a body. The header includes a content length field and the body includes communication data. In the embodiment, the first SIP packet is combined by a first "180 Ring" message and a former part of a second "180 Ring", and the message is the second "180 Ring". The former part of the message is the former part of the second "180 Ring" message. A bit number of the communication data of the first SIP packet is greater than the content length field of the first SIP packet. In another embodiment, the message is an invite message or a "200 OK" message. The former part of the message is a header of the invite message or the "200 OK" message. A bit number of the communication data of the first SIP packet is less than the content length field of the first SIP packet.

In step S302, the obtaining module 104 determines whether a bit number of the communication data of the body is greater or less than the content length field of the first SIP packet.

If the bit number of the communication data of the first SIP packet is greater than the content length field of the first SIP packet, then in step S304, the obtaining module 104 cuts and buffers excess part of the communication data which is greater than the content length field so as to obtain the former part of the message from the first SIP packet. In the embodiment, the first SIP packet is combined by a first "180 Ring" message and a former part of a second "180 Ring" and the obtaining module 104 obtains the former part of the second "180 Ring" message.

In step S305, the translating module 108 translates and sends out the first SIP packet. In the embodiment, the translating module 108 translates and sends out the first "180 Ring" message.

In step S306, the receiving module 100 receives a second SIP packet. The second SIP packet includes a latter part of the message. In the embodiment, the latter part of the message is the latter part of the second "180 Ring" message.

In step S308, the reassembling module 106 reassembles the second SIP packet by combining the latter part with the buffered excess part of the communication data of the first SIP packet. In the embodiment, the reassembling module 106 reassembles the former part of the second "180 Ring" message and the latter part of the second "180 Ring" message so as to obtain the second "180 Ring" message.

In step S310, the translating module 108 translates and sends out the reassembled second SIP packet. The reassembled second SIP packet includes the former part of the message and the latter part of the message. In the embodiment, the translating module 108 translates and sends out the second "180 Ring" message.

If the bit number of the communication data of the first SIP packet is less than the content length field of the first SIP packet, then in step S312, the obtaining module 104 copies and buffers the former part of the message from the first SIP packet. In the embodiment, the first SIP packet is the header of the invite message or the "200 OK" message and the obtaining module 104 obtains the header of the invite message or the "200 OK" message.

In step S313, the translating module 108 translates and sends out the first SIP packet. In the embodiment, the translating module 108 translates and sends out the header of the invite message or the "200 OK" message.

In step S314, the receiving module 100 receives a second SIP packet. The second SIP packet includes a latter part of the message. In the embodiment, the latter part of the message is a body of the invite message or the "200 OK" message.

In step S316, the reassembling module 106 reassembles the second SIP packet by combining the latter part with the buffered former part of the message. In the embodiment, the reassembling module 106 reassembles the header and the body of the invite message or the "200 OK" message so as to obtain the invite message or the "200 OK" message.

In step S318, the translating module 108 translates the reassembled second SIP packet. The reassembled second SIP packet includes the former part of the message and the latter part of the message. In the embodiment, the translating module 108 translates the invite message or the "200 OK" message.

In step S320, the translating module 108 obtains and sends out the body of the reassembled and translated second SIP packet. In the embodiment, the translating module 108 obtains and sends out the body of the invite message or the "200 OK" message because the header of the invite message or the "200 OK" message has been sent out.

Therefore, the network address translation device 10 of the present disclosure processes anomalistic SIP packets, which improves voice definition and makes communication better between the SIP clients.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A session initiation protocol (SIP) packet processing method comprising:
 receiving a first SIP packet, wherein the first SIP packet at least comprises a former part of a message, wherein the first SIP packet comprises a header and a body, the header comprises a content length field, and the body comprises communication data, wherein the message is a "180 Ring" message;
 obtaining the former part of the message from the first SIP packet, wherein the obtaining step comprises:
  determining whether a bit number of the communication data is greater or less than the content length field of the first SIP packet; and
  cutting and buffering excess part of the communication data which is greater than the content length field so as to obtain the former part of the message from the first SIP packet if the bit number of the communication data of the first SIP packet is greater than the content length field of the first SIP packet;
 translating and sending out the first SIP packet;
 receiving a second SIP packet, wherein the second SIP packet comprises a latter part of the message;
 reassembling the second SIP packet by combining the latter part with the obtained former part of the message; and
 translating and sending out the reassembled second SIP packet.

2. The SIP processing method as claimed in claim 1, wherein the first SIP packet comprises the former part of the "180 Ring" message, and the second SIP packet comprises the latter part of the "180 Ring" message.

3. The SIP processing method as claimed in claim 1, wherein the message is an invite message or a "200 OK" message comprising a header and a body.

4. The SIP processing method as claimed in claim 3, wherein obtaining the former part of the message from the first SIP packet further comprises:
 copying and buffering the former part of the message from the first SIP packet if the bit number of the communication data of the body is less than the content length field of the first SIP packet.

5. The SIP processing method as claimed in claim 4, wherein translating and sending out the reassembled second SIP packet comprising:
 translating the reassembled second SIP packet; and
 obtaining and sending out the body of the reassembled and translated second SIP packet.

6. The SIP processing method as claimed in claim 5, wherein the first SIP packet comprises the header of the invite message or the "200 OK" message, the second SIP packet comprises the body of the invite message or the "200 OK" message.

7. A network address translation device for processing session initiation protocol (SIP) packet, the network address translation device comprising a processor, a memory, and one or more programs, wherein the one or more programs are stored in the memory and operable to be executed by the processor, the programs comprising:
 a receiving module operable to receive a first SIP packet and a second SIP packet, wherein the first SIP packet at least comprises a former part of a message and the second SIP packet comprises a latter part of the message, wherein the first SIP packet comprises a header and a body, wherein the header comprises a content length field, and the body comprises communication data, wherein the message is a "180 Ring" message;
 an obtaining module operable to obtain the former part of the message from the first SIP packet, further operable to determine whether a bit number of the communication data of the body is greater or less than the content length field of the first SIP packet, and further operable to cut and buffer excess part of the communication data which is greater than the content length field so as to obtain the former part of the message from the first SIP packet upon the condition that the bit number of the communication data of the body is greater than the content length field of the first SIP packet;
 a reassembling module operable to reassemble the second SIP packet by combining the latter part with the obtained former part of the message from the first SIP packet upon the condition that the obtaining module has obtained the former part of the message from the first SIP packet; and
 a translating module operable to translate and send out the first SIP packet and the reassembled second SIP packet.

8. The network address translation device as claimed in claim 7, wherein the first SIP packet comprises the former part of the "180 Ring" message, and the second SIP packet comprises the latter part of the "180 Ring" message.

9. The network address translation device as claimed in claim 7, wherein the message is an invite message or a "200 OK" message comprising a header and a body.

10. The network address translation device as claimed in claim 9, wherein the obtaining module is further operable to copy and buffer the former part of the message from the first SIP packet upon the condition that the bit number of the communication data of the body is less than the content length field of the first SIP packet.

11. The network address translation device as claimed in claim 10, wherein the translating module is further operable to obtain and send out the body of the reassembled and translated second SIP packet.

12. The network address translation device as claimed in claim 11, wherein the first SIP packet comprises the header of the invite message or the "200 OK" message, the second SIP packet comprises the body of the invite message or the "200 OK" message.

* * * * *